(12) United States Patent
Huddleston (10) Patent No.: US 10,591,706 B2
(45) Date of Patent: Mar. 17, 2020

(54) LWIR IMAGING LENS, IMAGE CAPTURING SYSTEM HAVING THE SAME, AND ASSOCIATED METHODS

(71) Applicant: FLIR Systems Trading Belgium BVBA, Meer (BE)

(72) Inventor: Jeremy Huddleston, Oviedo, FL (US)

(73) Assignee: FLIR Systems Trading Belgium BVBA, Meer (BE)

( * ) Notice: Subject to any disclaimer, the term of this patent is extended or adjusted under 35 U.S.C. 154(b) by 126 days.

(21) Appl. No.: 15/870,377

(22) Filed: Jan. 12, 2018

(65) Prior Publication Data

US 2018/0136441 A1 May 17, 2018

Related U.S. Application Data

(60) Division of application No. 15/161,791, filed on May 23, 2016, now Pat. No. 9,891,414, which is a
(Continued)

(51) Int. Cl.
*G02B 13/14* (2006.01)
*G02B 13/00* (2006.01)
(Continued)

(52) U.S. Cl.
CPC ............. *G02B 13/008* (2013.01); *G02B 7/04* (2013.01); *G02B 13/003* (2013.01); *G02B 13/14* (2013.01); *H04N 5/33* (2013.01)

(58) Field of Classification Search
CPC ... G02B 3/00; G02B 3/02; G02B 7/02; G02B 7/04; G02B 9/04; G02B 9/06; G02B 9/08;
(Continued)

(56) References Cited

U.S. PATENT DOCUMENTS 3,160,700 A 12/1964 Snyder
4,419,182 A 12/1983 Westerberg et al.
(Continued)

FOREIGN PATENT DOCUMENTS

CN 1576941 A 2/2005
CN 101387737 A 3/2009
(Continued)

OTHER PUBLICATIONS

George Curatu, Design and fabrication of low-cost thermal imaging optics using precision chalcogenide glass molding, SPIE Proceedings, vol. 7060, Aug. 29, 2007.
(Continued)

*Primary Examiner* — Arnel C Lavarias
(74) *Attorney, Agent, or Firm* — Haynes and Boone, LLP (57) ABSTRACT

An imaging lens for use with an operational waveband over any subset of 7.5-13.5 μm may include a first optical element of a first high-index material and a second optical element of a second high-index material. At least two surfaces of the first and second optical elements may be optically powered surfaces. A largest clear aperture of all optically powered surfaces may not exceed a diameter of an image circle of the imaging lens corresponding to a field of view of 55 degrees or greater by more than 30%. The first and second high-index materials may have a refractive index greater than 2.2 in the operational waveband, an absorption per mm of less than 75% in the operational waveband, and an absorption per mm of greater than 75% in a visible waveband of 400-650 nm.

11 Claims, 7 Drawing Sheets

Related U.S. Application Data continuation of application No. 13/356,211, filed on Jan. 23, 2012, now Pat. No. 9,348,120.

(51) Int. Cl.
*G02B 7/04* (2006.01)
*H04N 5/33* (2006.01)

(58) Field of Classification Search
CPC .............. G02B 13/001; G02B 13/0015; G02B 13/002; G02B 13/003; G02B 13/008; G02B 13/0085; G02B 13/14; G02B 13/16; G02B 13/18; G02B 25/00; G02B 25/001; G02B 13/146; G01J 1/04; G01J 1/0407; G01J 1/0411; G01J 1/0448; G01J 5/00; G01J 2005/0077; G01J 5/08; G01J 5/0803; G01J 5/084; G01J 5/0843
USPC ....... 359/356, 350, 354, 355, 362, 363, 642, 359/646, 661, 717, 793, 794, 796, 819, 359/822, 823, 825, 826, 827, 829
See application file for complete search history.

(56) References Cited

U.S. PATENT DOCUMENTS

| | | | |
|---|---|---|---|
| 4,482,443 A | 11/1984 | Bacon et al. | |
| 4,537,464 A | 8/1985 | Boutellier | |
| 4,827,130 A | 5/1989 | Reno | |
| 5,833,596 A * | 11/1998 | Bonnell | A61B 1/042 600/109 |
| 6,027,595 A | 2/2000 | Suleski | |
| 6,535,332 B1 | 3/2003 | Nakano et al. | |
| 6,999,243 B2 | 2/2006 | Chipper | |
| 7,863,570 B2 | 1/2011 | Myers et al. | |
| 8,044,355 B2 | 10/2011 | Gibbons et al. | |
| 9,348,120 B2 | 5/2016 | Huddleston | |
| 9,891,414 B2 * | 2/2018 | Huddleston | G02B 13/14 |
| 2002/0148560 A1 | 10/2002 | Carr | |
| 2003/0117482 A1 | 6/2003 | Border et al. | |
| 2004/0218284 A1 | 11/2004 | Chen et al. | |
| 2005/0018314 A1 | 1/2005 | Yamaguchi et al. | |
| 2005/0110104 A1 | 5/2005 | Boettiger et al. | |
| 2006/0016995 A1 | 1/2006 | Kummer et al. | |
| 2008/0314436 A1 | 12/2008 | O,Connell et al. | |
| 2009/0224156 A1 | 9/2009 | Gibbons et al. | |
| 2012/0099848 A1 | 4/2012 | Shabtay et al. | |
| 2012/0113504 A1 | 5/2012 | Tanami et al. | |
| 2012/0176668 A1 | 7/2012 | Saito et al. | |
| 2012/0188635 A1 | 7/2012 | Kubala et al. | |
| 2012/0229892 A1 | 9/2012 | Kang et al. | |
| 2013/0076900 A1 | 3/2013 | Mrozek et al. | |
| 2013/0208353 A1 | 8/2013 | Huddleston | |
| 2013/0293970 A1 | 11/2013 | Qiu et al. | |

FOREIGN PATENT DOCUMENTS

| | | |
|---|---|---|
| CN | 102466861 A | 5/2012 |
| EP | 1077386 A1 | 2/2001 |
| EP | 2034344 A2 | 3/2009 |
| EP | 2034344 A3 | 3/2009 |
| JP | 2005-077556 A | 3/2005 |
| WO | WO 2012/100405 A1 | 8/2012 |

OTHER PUBLICATIONS

Edmund Optics "Understanding Optical Specifications" https://www.edmundoptics.comlresources/applicationnotes/ optics/understanding-optical-specifications/ printed Jun. 2017.

Thurber, et al. "Semiconductor Measurement Technology: The Relationship Between Resistivity and Dopant Density for Phosphorus and Boron-Doped Silicon", 1981.

U.S. Notice of Allowance dated Apr. 24, 2019 for U.S. Appl. No. 15/933,014, David Ovrutsky, et al.

* cited by examiner

LWIR IMAGING LENS, IMAGE CAPTURING SYSTEM HAVING THE SAME, AND ASSOCIATED METHODS

CROSS REFERENCE TO RELATED APPLICATION

This is a division of U.S. patent application Ser. No. 15/161,791 filed May 23, 2016, which is a continuation of U.S. patent application Ser. No. 13/356,211 filed Jan. 23, 2012, now U.S. Pat. No. 9,348,120 B2, the entire contents of which is hereby incorporated by reference.

BACKGROUND OF THE INVENTION

1. Field of the Invention

Embodiments relate to an imaging lens for the long wavelength infrared (LWIR) region, an image capturing system including the same, and associated methods.

2. Description of the Related Art

As with most technology, there is a demand for smaller and cheaper thermal imagers, whether as stand alone devices or integrated into mobile devices, electronic device, and so forth.

SUMMARY OF THE INVENTION

Embodiments are directed to an imaging lens for use with an operational waveband over any subset of 7.5-13.5 µm. The imaging lens may include a first optical element of a first high-index material, the first optical element having a front surface and a rear surface and a second optical element of a second high-index material, the second optical element having a front surface and a rear surface, the front surface of the second optical element facing the rear surface of the first optical element. At least two surfaces of the first and second optical elements may be optically powered surfaces. A largest clear aperture of all optically powered surfaces may not exceed a diameter of an image circle of the imaging lens corresponding to a field of view of 55 degrees or greater by more than 30%. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

The first and second high-index materials may be identical.

At least one of the first and second high-index materials may be silicon.

The largest clear aperture does not exceed the diameter of the image circle by more than 20%.

Three surfaces of the first and second optical elements may be optically powered surfaces.

The optically powered surfaces may be the front and rear surfaces of the first optical element and the front surface of the second optical element.

All three of the optically powered surfaces may be aspheric.

Each optically powered surface may have a positive power at an apex thereof.

Each optically powered surface may have a maximum sag height difference across the clear aperture of less than 100 µm.

Each optically powered surface may have a maximum sag height difference across the clear aperture of 50 µm or less.

One, two, or three of the optically powered surfaces may be aspheric.

The F-number of the imaging lens may be less than 1.1.

The imaging lens may include an optical stop at the front surface of the first lens element.

The optical stop may be effectively in contact with the front surface of the first lens element.

The optical stop may include a metal, e.g., chromium, aperture effectively in contact with the front surface of the first lens element.

The metal aperture may have a thickness of less than 200 nm.

Transmission through the optical stop may be less than 0.5% in the operational waveband.

The optical stop may be adhered to the front surface of the first optical element.

Center thicknesses of the first and second optical elements may be within 15% of one another.

A center thickness of each of the first and second optical elements is greater than 500 µm and less than 1500 µm, e.g., greater than 500 µm and less than 1000 µm.

The imaging lens may include a spacer between and adhered to the first and second optical elements.

The imaging lens may include a first flat region on the rear surface of the first optical element and a second flat region on the front surface of the second optical element, wherein the spacer is adhered to the first and second optical elements at the first and second flat regions.

The imaging lens may include a diffractive optical element on the front surface of the first optical element, the rear surface of the first optical element, the front surface of the second optical element, and/or the rear surface of the second optical element.

The diffractive optical element may be on an optically powered surface having the greatest power.

Embodiments are directed to an imaging system for use with an operational waveband over any subset of 7.5-13.5 µm. The imaging system may include a sensor for use with an operational waveband over any subset of 7.5-13.5 µm and an imaging lens imaging the operational waveband onto the sensor. The imaging lens may include a first optical element of a first high-index material, the first optical element having a front surface and a rear surface and a second optical element a second high-index material, the second optical element having a front surface and a rear surface, the front surface of the second optical element facing the rear surface of the first optical element. At least two surfaces of the first and second optical elements may be optically powered surfaces. A maximum clear aperture of all optically powered surfaces may not exceed an image diagonal of the sensor by more than 30%. The first and second high-index materials may have a refractive index greater than 2.2 in the operational waveband, an absorption per mm of thickness less than 75% in the operational waveband, and an absorption per mm of thickness greater than 75% in a visible waveband of 400-650 nm.

A ratio of an optical track length of the imaging system to an image diagonal of the sensor may be less than 2.5.

The sensor may include a cover glass of a third high-index material having a refractive index greater than 2.2 in the operational band.

The third high index material and at least one of the first and second high index materials may be identical.

The third high index material may be silicon.

The cover glass has a thickness greater than 0.5 mm and less than 1.0 mm.

A distance between an apex of the rear surface of the first optical element and an apex of the front surface of the second optical element may be less than 50% greater than a distance between an apex of the rear surface of the second optical element and the cover glass.

A distance between an apex of the rear surface of the first optical element and an apex of the front surface of the second optical element may be greater than 50% larger than a distance between an apex the rear surface of the second optical element and the cover glass.

The imaging system may include an adjustment mechanism for altering a distance between the imaging lens and the sensor.

The adjustment mechanism may include a threaded barrel assembly housing the imaging lens.

Embodiments are directed to an electronic device including an imaging system for use with an operational waveband over any subset of 7.5-13.5 µm.

Embodiments are directed to an imaging lens for use with an operational waveband over any subset of 7.5-13.5 µm. The imaging lens may include a first optical element of a first high-index material, the first optical element having a front surface and a rear surface, an first optically powered surface on one of the front and rear surfaces of the first optical element, and a second optical element of a second high-index material, the second optical element having a front surface and a rear surface, the front surface of the second optical element facing the rear surface of the first optical element, a second optically powered surface on one of the front and rear surfaces of the second optical element. The first and second high-index materials have a refractive index greater than 2.2 in the operational waveband, an absorption per mm of thickness less than 75% in the operational waveband, and an absorption per mm of thickness greater than 75% in a visible waveband of 400-650 nm.

The first optically powered surface may be on the front surface of the first optical element and the second optically powered surface may be on the rear surface of the second optical element.

The rear surface of the first optical element and the front surface of the second optical element may have negligible optical power therein.

Embodiments are directed to an imaging lens for use with an operational waveband over any subset of 7.5-13.5 µm. The imaging lens may include a first silicon optical element, the first silicon optical element having a front surface and a rear surface; and a second silicon optical element, the second silicon optical element having a front surface and a rear surface, the front surface of the second silicon optical element facing the rear surface of the first silicon optical element. At least two surfaces of the first and second optical elements may be etched optically powered surfaces.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete.

In designing long wavelength infrared (LWIR) sensors, also known as thermal imagers, materials for use as thermal lenses typically have high transmission in the LWIR waveband of 7.5-13.5 µm. Current typical materials for thermal lenses include germanium (Ge), chalcogenide glass, zinc selenide (ZnSe), and zinc sulfide (ZnS). However, many optical materials having other desirable properties are excluded due to a high absorption in the LWIR waveband of 7.5-13.5 µM.

As described in detail below, as designs for LWIR sensors shrink, e.g., for use in mobile devices, a thickness of material used for thermal lenses may decrease sufficiently to allow materials that are typically considered too absorptive in the LWIR waveband to be used as thermal lenses. This allows the use of other materials, e.g., silicon, that have a strong absorption band in the LWIR waveband, but offer other advantages, e.g., manufacturability, low coefficient of thermal expansion, low dispersion, etc., to be employed.

The imaging lenses discussed in detail below are to be operational over any subset of the LWIR waveband. These imaging lenses are designed to be made in a high index material, i.e., greater than 2.2, having an absorption per mm of thickness less than 75% in the operational waveband, and an absorption per mm of thickness greater than 75% in a visible waveband of 400-650 nm. While silicon meets these parameters and provides advantages noted above, other materials that meet these parameters may also be used.

Figure 1:
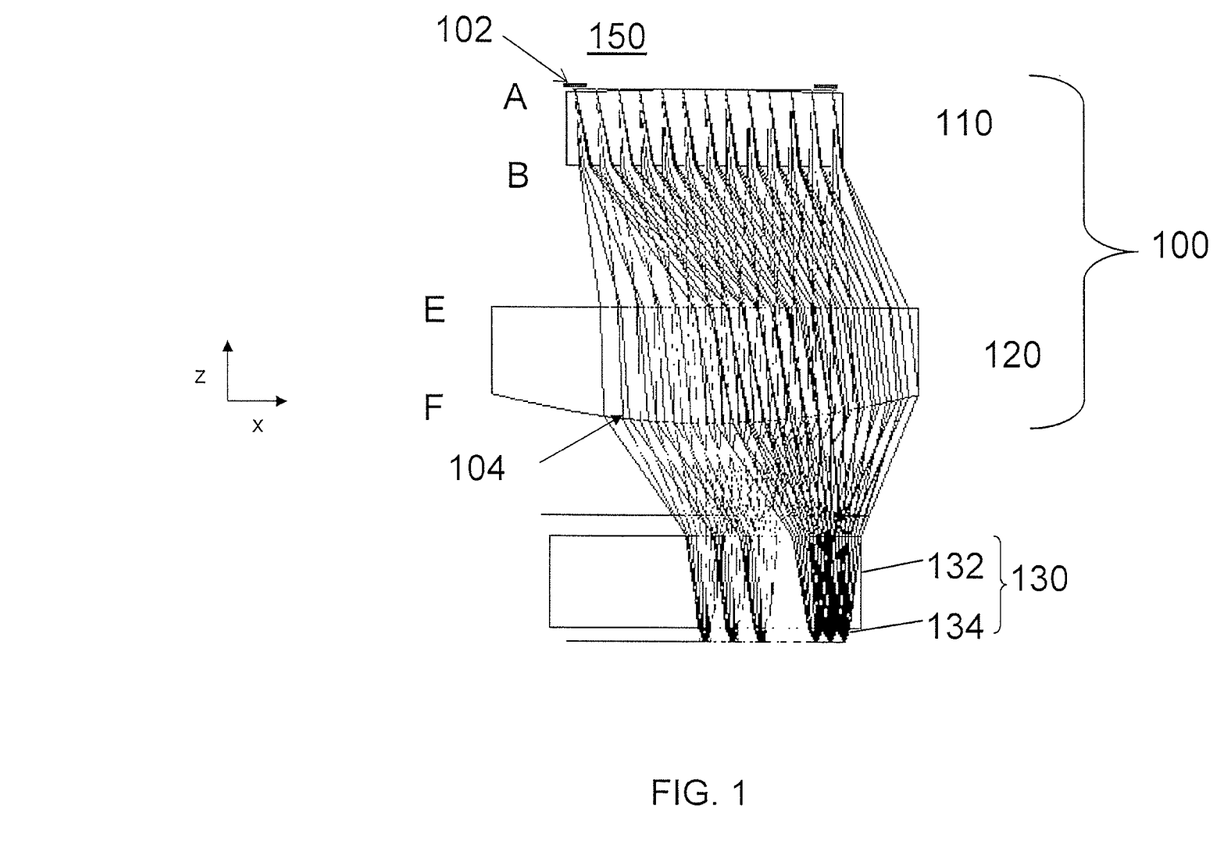
FIG. 1 illustrates a schematic side view of an imaging capturing system in accordance with an embodiment.

FIG. 1 illustrates a schematic side view of an image capturing system 150 in the LWIR waveband in accordance with an embodiment. As illustrated in FIG. 1, the image capturing system 150 includes an imaging lens 100 and a sensor 130.

The imaging lens 100 may include a first optical element 110 and a second optical element 120. In the schematic illustration of FIG. 1, a spacer (which would include surfaces C and D, see FIG. 6) between the first optical element 110 and the second optical element 120 has been omitted for clarity.

In this particular embodiment, both the first optical element 110 and the second optical element 120 are planoconvex lenses. A surface A, here an input surface of the imaging lens 100, of the first optical element 110 and a surface F, here a final surface of the imaging lens 100, both have optical power. One or both of these surfaces may be aspheric. Surface B of the first optical element 110 and surface E of the second optical element 120 have no optical power, here are both planar, and face each other.

The imaging lens 100 may also include an aperture stop 102. For example, the aperture stop 102 may be adjacent surface A, e.g., directly on surface A, of the first optical element 110. The aperture stop 102 may be made of metal, e.g., chromium, a dyed polymer, or any suitable material that is opaque to LWIR. The aperture stop 102 may be at any appropriate location within the imaging lens 100. The aperture stop 102 may be thin, e.g., have a thickness of less than 200 nm, but thick enough to be effective, i.e., have a transmission therethrough of less than about 0.5% in the operational waveband. The f-number for the imaging lens 100 may be less than 1.1.

If the material used for one or both optical elements 110, 120 presents chromatic dispersion over an operational waveband or if the imaging lens 100 otherwise requires correction, a diffractive element 104 may be provided on one or more of the surfaces A, B, E, or F. For example, the diffractive element 104 may be on the surface having the most optical power, here, surface F.

The sensor 130 may include a sensor cover glass 132 and pixels in a sensor image plane 134, the pixels detecting LWIR radiation. The sensor cover glass 132 may be made of silicon and may have a thickness between 0.5 mm and 1.0 mm. The working distance of the image capturing system 150 is a distance from a bottom surface, i.e., an apex of the bottom surface, of the imaging lens 100, here surface F, to a top surface of the cover glass 132. The optical track length of the imaging capturing system 150 is a distance from an apex of the first surface of the imaging lens 100, here surface A, to the sensor image plane 134.

While the above embodiment provides a design in which only two surfaces have optical power for the imaging lens 100 along the z-direction, the maximum clear aperture of the imaging lens 100 (here at surface F) is much larger, e.g., more than 50% greater, than the sensor image diagonal, i.e., a diagonal across the sensor image plane 134, and the maximum SAG of the imaging lens 100 (also at surface F) is relatively large, e.g., much greater than 100 μm. In the particular design illustrated in FIG. 1, the maximum clear aperture is 2.6 mm, the sensor image diagonal is 1.7 mm, and the maximum SAG is 203 μm.

However, having the maximum clear aperture being much larger than the sensor image diagonal and having a large maximum SAG may present manufacturability and cost issues, particularly when these optical elements are to be made on a wafer level, as described later. Without reference to a particular sensor, i.e., the sensor image diagonal, the maximum clear aperture may be defined relative to an image circle of the lens. In particular, the image circle of the lens is to be understood as the diameter of the image produced at the focal plane of the lens corresponding to a given field of view (FOV), e.g., 55 degrees or greater, of the lens. In the context of an imaging system having an imaging lens and an image sensor, the image circle is understood to be the largest distance across the image that is used by the image sensor, typically the image sensor diagonal of the sensor with which the imaging lens used or intended to be used.

Therefore, embodiments illustrated in FIGS. 2 to 5 may employ a two optical element design in which optical power is provided on three surfaces. Spreading the optical power over three surfaces, while increasing the number of surfaces to be manufactured, allows a maximum clear aperture much closer in size to the sensor image diagonal (or image circle) and a reduced SAG to be realized. In embodiments, the maximum clear aperture of the imaging lens may be less than 30% greater, e.g., less than 20% greater, than the sensor image diagonal or the image circle corresponding to a FOV of 55 degrees or greater.

Figure 2:
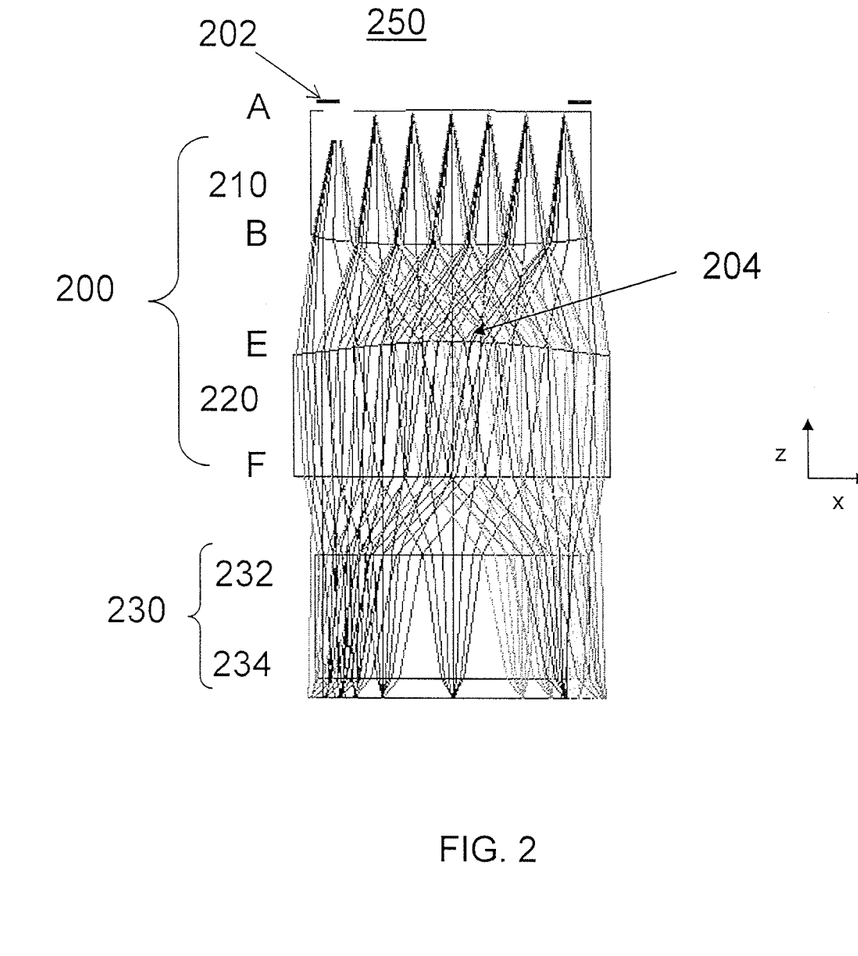
FIG. 2 illustrates a schematic side view of an imaging capturing system in accordance with an embodiment.

FIG. 2 illustrates a schematic side view of an imaging capturing system 250 in the LWIR waveband in accordance with an embodiment. As illustrated in FIG. 2, the image capturing system 250 includes an imaging lens 200 and a sensor 230.

The imaging lens 200 may include a first optical element 210 and a second optical element 220. In the schematic illustration of FIG. 2, a spacer (which would include surfaces C and D, see FIG. 6) provides an air gap between the first optical element 210 and the second optical element 220 has been omitted for clarity. Features outside the optical surfaces could be used to nest them together, e.g., the air gap may be provided by a barrel or housing.

In this particular embodiment, three surfaces, here surfaces A, B, and E, have optical power therein. One, two, or all three surfaces may be aspheric. All three surfaces may have a positive power at the apex thereof, i.e., may be convex at the apex thereof. The imaging lens 200 may also include the aperture stop 202, which may have the same configuration/properties noted above for aperture stop 102. The f-number for the imaging lens 200 may be less than 1.1.

If the material used for one or both optical elements 210, 220 presents chromatic dispersion over an operational waveband or if the imaging lens 200 otherwise requires correction, a diffractive element 204 may be provided on one or more of the surfaces A, B, E, or F. For example, the diffractive element 204 may be on the surface having the most optical power, here, surface E.

The sensor 230 may include a sensor cover glass 232 and pixels in a sensor image plane 234, the pixels detecting LWIR radiation. In the particular configuration, the sensor image diagonal of 1.443 mm.

Figure 3A:
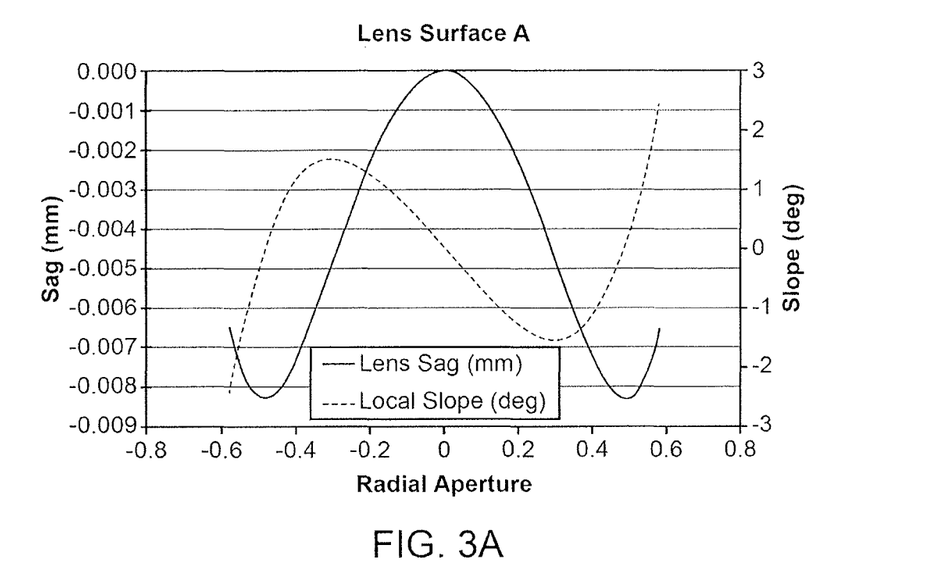
FIGS. 3A to 3C illustrate plots of lens sag and slope versus radial aperture for lens surfaces having power therein in FIG. 2.
Figure 3B:
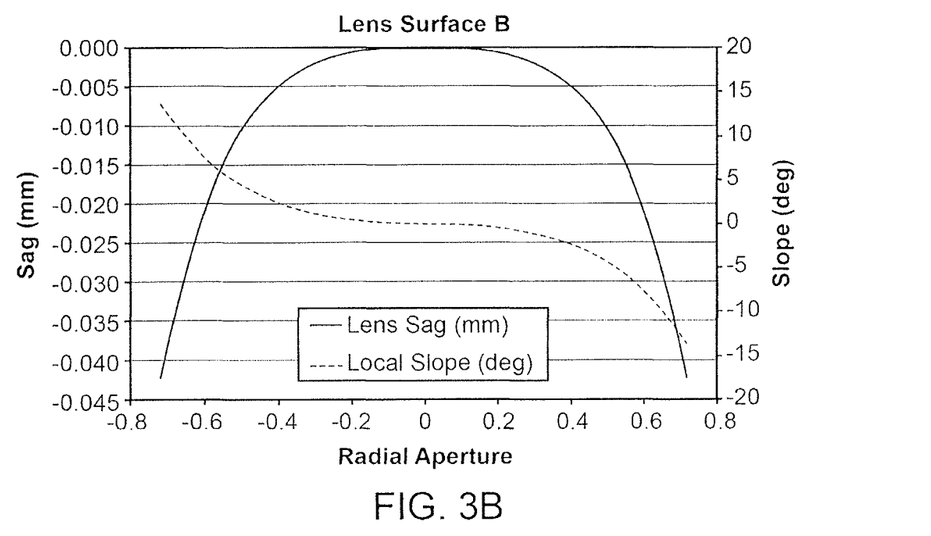
Figure 3C:
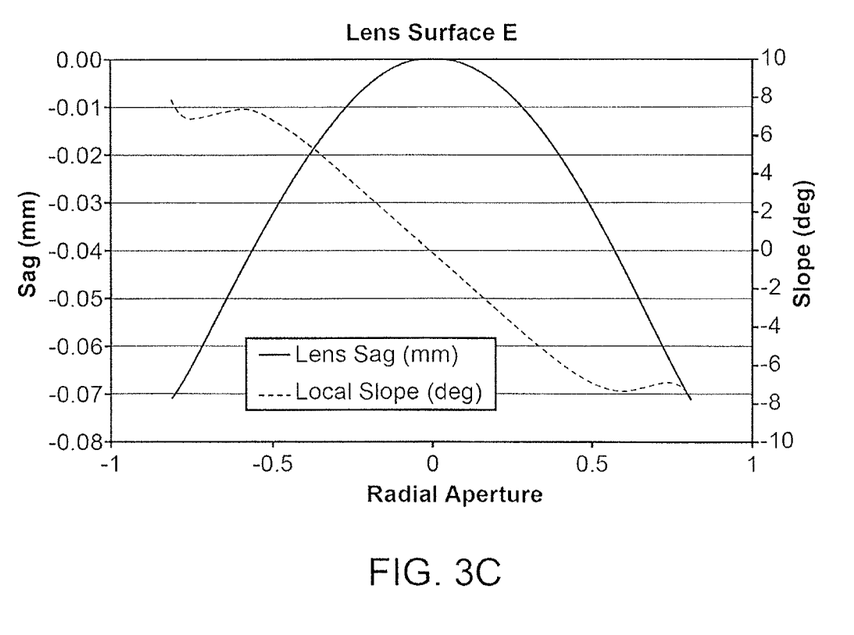

FIGS. 3A to 3C illustrate plots of lens sag and slope versus radial aperture for lens surfaces A, B, and E of FIG. 2.

As can be seen in FIG. 3A, surface A is a gullwing surface, i.e., has a convex apex and a concave edge. For surface A, the clear aperture is 1.159 mm and the SAG over the clear aperture is 0.008 mm (8 μm).

As can be seen in FIG. 3B, surface B is a convex surface. For surface B, the clear aperture is 1.433 mm and the SAG over the clear aperture is 0.042 mm (42 μm).

As can be seen in FIG. 3C, surface E is a convex surface. For surface E, the clear aperture is 1.613 mm and the SAG over the clear aperture is 0.071 mm (71 μm).

Thus, for the imaging lens 200, the maximum clear aperture is 1.613 mm, i.e., less than 30% greater than the sensor image diagonal (or the image circle), and the maximum SAG is 71 μm, i.e., less than 100 μm.

Further, by having small SAGs, if a starting thickness, i.e., before forming the lens surface, of the optical elements 210, 220 is the same, then the center thickness of the optical elements 210, 220 may be within 15% of one another. In this particular example, the optical element 210 has a center thickness of 0.68 mm and the optical element 220 has a center thickness of 0.69 mm. For example, when made on a wafer level, a starting thickness of substrates used to create the optical elements 210, 220, may be between 0.5 mm and 1.5, mm, e.g., 0.5 mm to 1.0 mm, with this particular example having a starting thickness of 0.7 mm. Using the same or standard substrate thickness, particularly thinner substrates, may reduce cost.

Further, in this particular example, the second optical element 220 is closer to the cover glass 132 than to the first optical element 210, with a difference between these distances, i.e., B to E and F to 132, being less than 50%. In this particular example, the optical track length is 3 and a ratio of the optical track length to the image diagonal of the sensor is less than 2.5.

Figure 4:
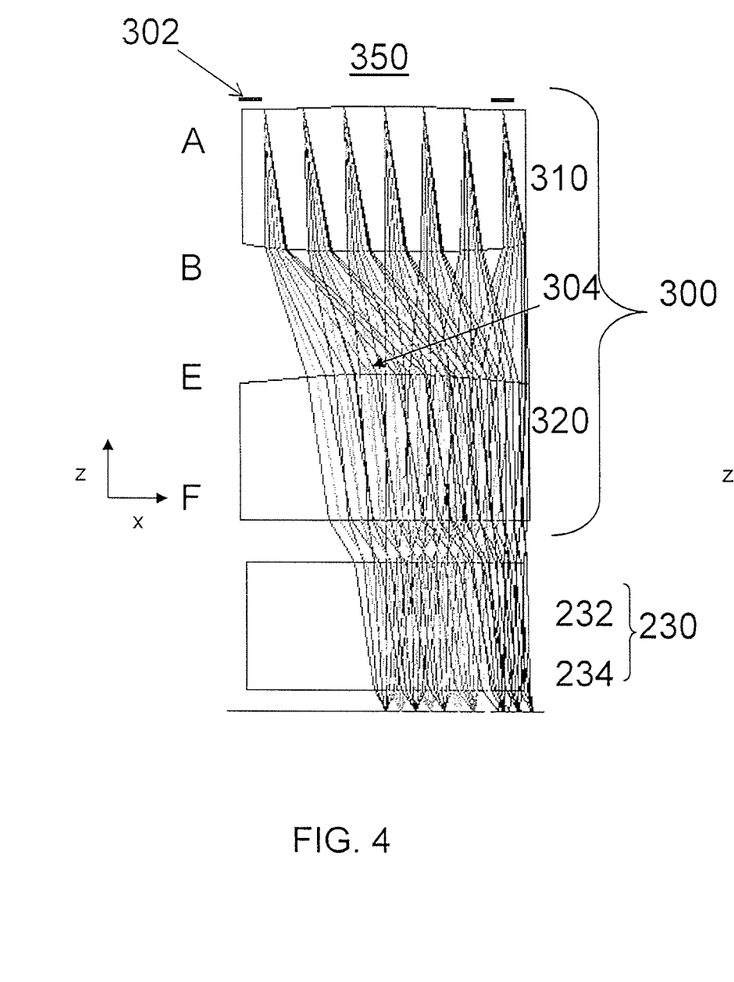
FIG. 4 illustrates a schematic side view of an image capturing system in accordance with an embodiment.

FIG. 4 illustrates a schematic side view of an imaging capturing system 350 in the LWIR waveband in accordance with an embodiment. As illustrated in FIG. 4, the image capturing system 350 includes an imaging lens 300 and the sensor 230.

The imaging lens 300 may include a first optical element 310 and a second optical element 320. In the schematic illustration of FIG. 4, a spacer (which would include surfaces C and D, see FIG. 6) between the first optical element 310 and the second optical element 320 has been omitted for clarity.

In this particular embodiment, three surfaces, here surfaces A, B, and E, have optical power therein. One, two, or all three surfaces may be aspheric The imaging lens 300 may also include the aperture stop 302, which may have the same configuration/properties noted above for aperture stop 102. The f-number for the imaging lens 300 may be less than 1.1.

If the material used for one or both optical elements 310, 320 presents chromatic dispersion over an operational waveband or if the imaging lens 300 otherwise requires correction, a diffractive element 304 may be provided on one or more of the surfaces A, B, E, or F. For example, the diffractive element 304 may be on the surface having the most optical power, here, surface E.

For the imaging lens 300, surface A is a gullwing surface having a clear aperture of 1.167 mm and SAG over the clear aperture of 0.017 mm (17 µm); surface B is a convex surface having a clear aperture of 1.398 mm and SAG over the clear aperture is 0.039 mm (39 µm); surface E is a gullwing surface having a clear aperture of 1.444 mm and SAG over the clear aperture is 0.046 mm (46 µm).

Thus, for the imaging lens 300, the maximum clear aperture is 1.444 mm, i.e., less than 30% greater than the sensor image diagonal (or than the image circle), and the maximum SAG is 46 µm, i.e., less than 100 µm. Further, in this particular example, the second optical element 320 is closer to the cover glass 132 than to the first optical element 310, with a difference between these distances, i.e., B to E and F to 132, being greater than 50%.

Figure 5:
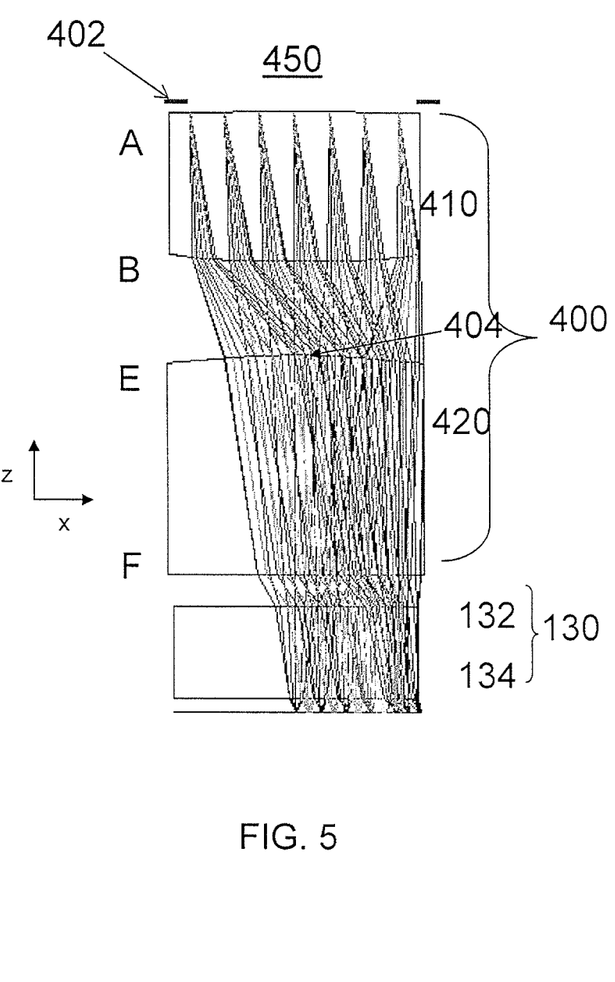
FIG. 5 illustrates a schematic side view of an image capturing system in accordance with an embodiment.

FIG. 5 illustrates a schematic side view of an imaging capturing system 450 in the LWIR waveband in accordance with an embodiment. As illustrated in FIG. 5, the image capturing system 450 includes an imaging lens 400 and the sensor 130. The image capturing system 450 is designed for a longer optical track length than the embodiments of FIGS. 2 and 4, so the imaging lens 400 is of a slightly larger scale, with a thickness of the first optical element 410 being 1.019 mm and a thickness of the second optical element 420 being 1.488 mm.

The imaging lens 400 may include a first optical element 410 and a second optical element 420. In the schematic illustration of FIG. 5, a spacer (which would include surfaces C and D, see FIG. 6) between the first optical element 410 and the second optical element 420 has been omitted for clarity.

In this particular embodiment, three surfaces, here surfaces A, B, and E, have optical power therein. One, two, or all three surfaces may be aspheric. The imaging lens 400 may also include the aperture stop 402, which may have the same configuration/properties noted above for aperture stop 102. The f-number for the imaging lens 400 may be less than 1.1.

If the material used for one or both optical elements 410, 420 presents chromatic dispersion over an operational waveband or if the imaging lens 400 otherwise requires correction, a diffractive element 404 may be provided on one or more of the surfaces A, B, E, or F. For example, the diffractive element 404 may be on the surface having the most optical power, here, surface A.

For the imaging lens 400, surface A is a gullwing surface having a clear aperture of 1.423 mm and SAG over the clear aperture of 0.017 mm (17 µm); surface B is a convex surface having a clear aperture of 1.716 mm and SAG over the clear aperture is 0.049 mm (49 µm); surface E is a convex surface having a clear aperture of 1.750 mm and SAG over the clear aperture is 0.054 mm (54 µm).

Thus, for the imaging lens 400, the maximum clear aperture is 1.75 mm, i.e., less than 30% greater than the sensor image diagonal (or than the image circle), and the maximum SAG is 54 µm, i.e., less than 100 µm. Further, in this particular example, the second optical element 420 is closer to the cover glass 132 than to the first optical element 410, with a difference between these distances, i.e., B to E and F to 132, being greater than 50%.

Figure 6:
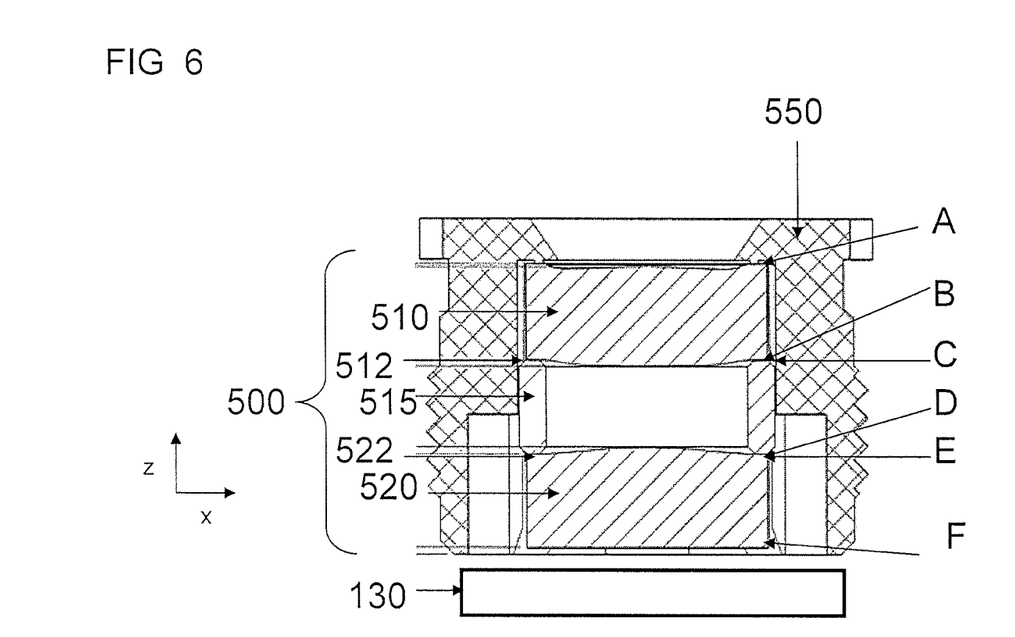
FIG. 6 illustrates a cross-sectional view of a module assembly including an imaging system in accordance with an embodiment.

Any of the imaging lenses 100, 200, 300, 400 discussed above may be provided in a barrel assembly 550, as illustrated in FIG. 6. In particular, the barrel assembly 550 may be a threaded barrel assembly such that a distance between an imaging lens 500 housed therein and the sensor 130, i.e., along the z-axis, may be altered. As illustrated therein, the imaging lens 500 may include a first optical element 510 and a second optical element 520 separated by a spacer 515 providing an air gap between surfaces B and E. The surfaces B and E may include relative planar portions 512, 522, i.e., flat regions, in a periphery thereof to facilitate securing of the spacer 515 thereto.

Method of Making

One or both of optical elements noted above may be silicon. Any one, two, or all of the lens surfaces noted above may be made using, e.g., the stamp and transfer technique disclosed in U.S. Pat. No. 6,027,595, which is hereby incorporated by reference in its entirety. As noted therein, these surfaces may be created on the wafer level, i.e., a plurality of these surfaces may be replicated and transferred to a wafer simultaneously and later singulated to realize individual optical elements. Depending on the material of the optical element, other techniques for forming one or more of the lens surfaces may include diamond turning or molding, e.g., high temperature molding.

In addition to fabrication of surfaces on a wafer level, as disclosed in U.S. Pat. No. 6,096,155, which is hereby incorporated by reference in its entirety, two or more wafers, each having a plurality of optical elements thereon may be secured together along the z-direction before singulation, such that individual optical systems each have an optical element from each wafer. A spacer wafer may be provided between the two wafers having the optical elements thereon. Alternatively, one of the wafers having optical elements thereon and the spacer wafer may be secured and singulated, and then secured to another wafer having optical elements thereon, or one of the wafers having optical elements thereon may have spacers die bonded thereon and then secured to the other wafer having optical elements thereon.

Devices Incorporating LWIR Imaging Lens

Figure 7:
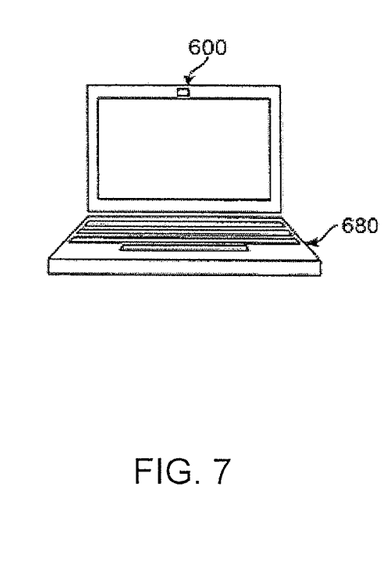
FIG. 7 illustrates a schematic perspective view of a computer incorporating an image capturing device in accordance with embodiments.
Figure 8:
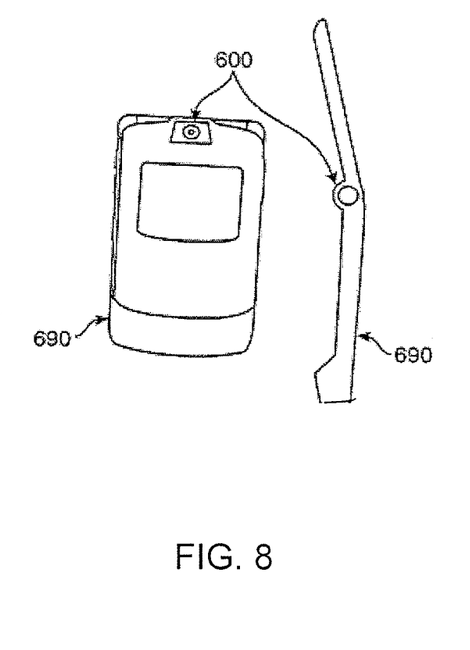
FIG. 8 illustrates a schematic perspective view of a mobile device incorporating an image capturing device in accordance with embodiments.

FIG. 7 illustrates a perspective view of a computer 680 having an LWIR imaging system 600 integrated therein. FIG. 8 illustrates a front and side view of a mobile telephone 690 having the LWIR imaging system 600 integrated therein. Of course, the LWIR imaging system 600 may be integrated at other locations and with other electronic devices, e.g., mobile devices, entertainment systems, stand-alone thermal imagers, and so forth, other than those shown. The LWIR imaging system 600 may be any of those noted above.

As used herein, the term "and/or" includes any and all combinations of one or more of the associated listed items. Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the teachings of the embodiments described herein.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Embodiments of the present invention have been disclosed herein and, although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present invention as set forth in the following claims.

What is claimed is:

1. An imaging system, comprising:
   a sensor for use with an operational waveband over any subset of 7.5-13.5 µm; and
   an imaging lens imaging the operational waveband onto the sensor, the imaging lens including:
      a first optical element of a first high-index material, the first optical element having a front surface and a rear surface; and
      a second optical element of a second high-index material, the second optical element having a front surface and a rear surface, the front surface of the second optical element facing the rear surface of the first optical element, wherein
         at least two surfaces of the first and second optical elements are optically powered surfaces,
         a maximum clear aperture of all optically powered surfaces does not exceed an image diagonal of the sensor by more than 30%,
         a ratio of an optical track length of the imaging system to an image diagonal of the sensor is less than 2.5, and
         the first and second high-index materials have a refractive index greater than 2.2 in the operational waveband, an absorption per mm of thickness less than 75% in the operational waveband, and an absorption per mm of thickness greater than 75% in a visible waveband of 400-650 nm.

2. An electronic device including the imaging system of claim 1.

3. An imaging system comprising:
   a sensor for use with an operational waveband over any subset of 7.5-13.5 µm; and
   an imaging lens imaging the operational waveband onto the sensor, the imaging lens including:
      a first optical element of a first high-index material, the first optical element having a front surface and a rear surface; and
      a second optical element of a second high-index material, the second optical element having a front surface and a rear surface, the front surface of the second optical element facing the rear surface of the first optical element, wherein
         at least two surfaces of the first and second optical elements are optically powered surfaces,
         a maximum clear aperture of all optically powered surfaces does not exceed an image diagonal of the sensor by more than 30%,
         the first and second high-index materials have a refractive index greater than 2.2 in the operational waveband, an absorption per mm of thickness less than 75% in the operational waveband, and an absorption per mm of thickness greater than 75% in a visible waveband of 400-650 nm, and
         the sensor includes a cover glass of a third high-index material having a refractive index greater than 2.2 in the operational waveband.

4. The imaging system as claimed in claim 3, wherein the third high-index material and at least one of the first and second high-index materials are identical.

5. The imaging system as claimed in claim 4, wherein the high-index material is silicon.

6. The imaging system as claimed in claim 3, wherein the cover glass has a thickness greater than 0.5 mm and less than 1.0 mm.

7. The imaging system as claimed in claim 3, wherein a distance between an apex of the rear surface of the first optical element and an apex of the front surface of the second optical element is less than 50% greater than a distance between an apex of the rear surface of the second optical element and the cover glass.

8. The imaging system as claimed in claim 3, wherein a distance between an apex of the rear surface of the first optical element and an apex of the front surface of the second optical element is greater than 50% larger than a distance between an apex the rear surface of the second optical element and the cover glass.

9. An imaging system comprising:
a sensor for use with an operational waveband over any subset of 7.5-13.5 μm;
an imaging lens imaging the operational waveband onto the sensor, the imaging lens including:
a first optical element of a first high-index material, the first optical element having a front surface and a rear surface; and
a second optical element of a second high-index material, the second optical element having a front surface and a rear surface, the front surface of the second optical element facing the rear surface of the first optical element, wherein
at least two surfaces of the first and second optical elements are optically powered surfaces,
a maximum clear aperture of all optically powered surfaces does not exceed an image diagonal of the sensor by more than 30%,
the first and second high-index materials have a refractive index greater than 2.2 in the operational waveband, an absorption per mm of thickness less than 75% in the operational waveband, and an absorption per mm of thickness greater than 75% in a visible waveband of 400-650 nm; and
an adjustment mechanism for altering a distance between the imaging lens and the sensor.

10. The imaging system as claimed in claim 9, wherein the adjustment mechanism includes a threaded barrel assembly housing the imaging lens.

11. An imaging lens for use with an operational waveband over any subset of 7.5-13.5 μm, the imaging lens comprising:
a first optical element of a first high-index material, the first optical element having a front surface and a rear surface, a first optically powered surface on one of the front and rear surfaces of the first optical element; and
a second optical element of a second high-index material, the second optical element having a front surface and a rear surface, the front surface of the second optical element facing the rear surface of the first optical element, a second optically powered surface on one of the front and rear surfaces of the second optical element, wherein
the rear surface of the first optical element and the front surface of the second optical element have negligible optical power therein, and
the first and second high-index materials have
a refractive index greater than 2.2 in the operational waveband,
an absorption per mm of thickness less than 75% in the operational waveband, and
an absorption per mm of thickness greater than 75% in a visible waveband of 400-650 nm, and
wherein the rear surface of the first optical element and the front surface of the second optical element have negligible optical power therein.

\* \* \* \* \*